April 7, 1959  C. ADLER, JR  2,881,307
UNDULATING EXTERIOR LIGHT FOR AIRCRAFT
Filed Dec. 5, 1957  2 Sheets-Sheet 1

INVENTOR
CHARLES ADLER, JR.

BY Cushman, Darby & Cushman
ATTORNEYS

April 7, 1959　　　　C. ADLER, JR　　　　2,881,307
UNDULATING EXTERIOR LIGHT FOR AIRCRAFT
Filed Dec. 5, 1957　　　　　　　　　　　　2 Sheets-Sheet 2

INVENTOR
CHARLES ADLER, JR

BY Cushman, Darby & Cushman
ATTORNEYS

United States Patent Office
2,881,307
Patented Apr. 7, 1959

2,881,307

UNDULATING EXTERIOR LIGHT FOR AIRCRAFT

Charles Adler, Jr., Baltimore, Md.

Application December 5, 1957, Serial No. 700,893

1 Claim. (Cl. 240—7.7)

This invention relates to apparatus for producing a beam of light varying in intensity, which apparatus may be used as an exterior position light for aircraft. In particular, the invention relates to such an apparatus which may be incorporated into a system that replaces the conventional anti-collision and position light systems now in widespread use.

The conventional anti-collision and position light system may be replaced by using high intensity undulating lights installed on the wing tips and tail portion of an aircraft and color-coded in the same manner as the conventional steady beam, low intensity position lights, and it is an object of this invention to provide an apparatus usable for such replacement, which apparatus produces a beam of light varying in intensity at any given point within the beam from a predetermined minimum intensity above zero to a predetermined maximum.

It is a further object of this invention to provide an apparatus of the above-described type which is easily installed, cheaply manufactured and reliable in operation.

A still further object of this invention is to provide an apparatus of the above-described type which represents an improvement on the apparatus disclosed and claimed in my United States Patent No. 2,605,384, issued July 29, 1952, and which incorporates lamps of the type disclosed and claimed in my United States Patent No. 2,365,504, issued December 19, 1944.

Particular objects of this invention are: (1) to provide an apparatus of the above described type which incorporates safety features that prevent the apparatus from becoming ineffective should certain electrical components such as a motor or lamp fail to operate; (2) to provide an apparatus of the above-described type which produces a beam of light having a spread of more than 90° but less than 180° in a given plane, the spread preferably being of a predetermined angle between 110° and 150°; and (3) to provide an apparatus of the above-described type which may be installed on aircraft without necessitating substantial alteration of the usual streamline construction of wings and/or tail.

The apparatus provided by this invention for accomplishing the objects generally set forth above may be best understood when the following description of the exemplary embodiments of the invention are considered in connection with the annexed drawings. Other objects and advantages will, at the same time, become apparent from such consideration.

In the drawings: Figure 1 is a plan view of an aircraft on which one embodiment of the apparatus of this invention has been installed.

Figure 1:
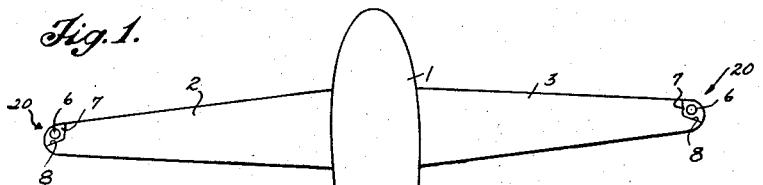

In Figure 1, the numeral 1 designates the fuselage of an aircraft having wings 2 and 3, a tail 4, and a dorsal fin 5.

At the end of each wing and in the tail portion of the aircraft, there is provided a unit 20 constructed in accordance with provisions of this invention. Each unit comprises a light source 6 which will be referred to in more detail hereinafter, and two planar reflecting surfaces 7 and 8 which are disposed in joining relation to one another with an angle between the surfaces of more than 90°. In each instance, the two planar reflecting surfaces 7 and 8 are disposed behind the light source 6. The planar surfaces 7 on the wings are disposed parallel to one another and parallel to an imaginary line running centrally and longitudinally of the fuselage 1.

The reflecting surfaces 8 on the wings are disposed with respect to surfaces 7 in accordance with the above stated angular relation and in such position as allows for reflection of the light emitted by sources 6 forwardly and to the side of fuselage 1. The disposition and alignment of the unit 20 disposed on the tail portion of the aircraft with respect to the units disposed on the wings is such that it produces a beam of light projecting rearwardly of the fuselage.

Figure 8:
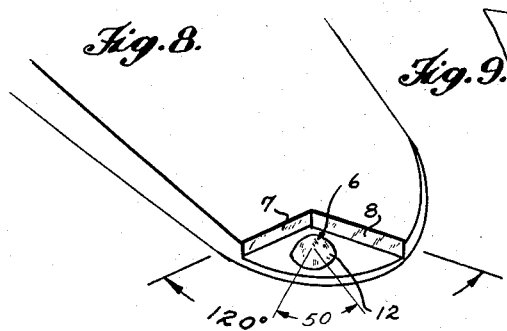
Figure 8 is a side elevational view showing the installation of the embodiment of Figures 1 and 2.

By reference to Figure 8 it will be seen that the planar reflecting surfaces 7 and 8 are disposed to provide a light spread through 120°. It should be understood, however, that these surfaces need only be disposed so as to provide a light spread through more than 90° and less than 180°. The combination of the spread of light produced by the three units 20 should be 360°, preferably with each providing a spread of 120° or, those on the wings providing a spread of 110° while that on the tail portion of the aircraft provide a light spread of 140°.

Of course, at least one piece of apparatus or unit 20 is required on each wing and at least one is required on the tail portion. The unit on the tail portion may be disposed on the dorsal fin 5, on the tail 4, or, in fact, in any suitable rear loaction. The apparatus on the tail portion, however, should be disposed along an imaginary line running centrally and longitudinally of the fuselage 1. All units should be disposed so that the beam projects upwardly from, and downwardly from, the aircraft through a substantial arc so that the lights may be seen from above and below.

Figure 2:
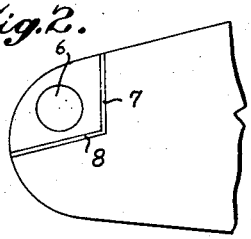
Figure 2 is a fragmental detail of the end of a wing of the aircraft shown in Figure 1.

In the embodiment of the apparatus shown in Figures 1, 2, and 8, a cover 12 is best shown in position in Figure 8, provided on the light source which cover is made of a light transmitting material. Thus, light is emitted from the source 6 throughout 360°, but the light emitted is reflected to provide the proper spread by the reflecting surfaces 7 and 8, which are part of the units 20.

Figure 3:
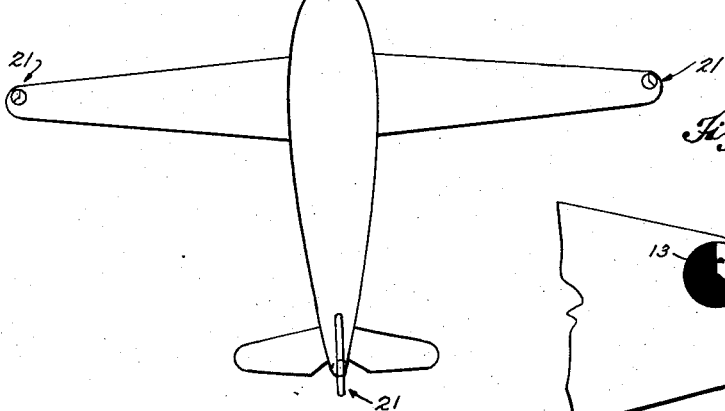
Figure 3 is a plan view of an aircraft on which the apparatus of another embodiment of this invention has been installed.
Figure 4:
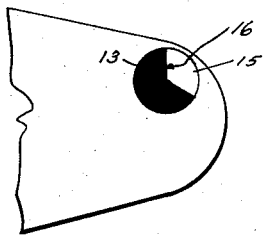
Figure 4 is a fragmental detail of the end of a wing of the aircraft shown in Figure 3.
Figure 9:
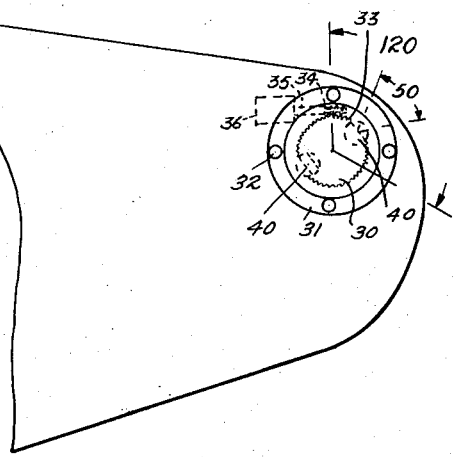
Figure 9 is a plan view of an end portion of an aircraft wing showing detailed construction of parts of the embodiments of the invention shown in Figures 1 and 3.
Figure 11:
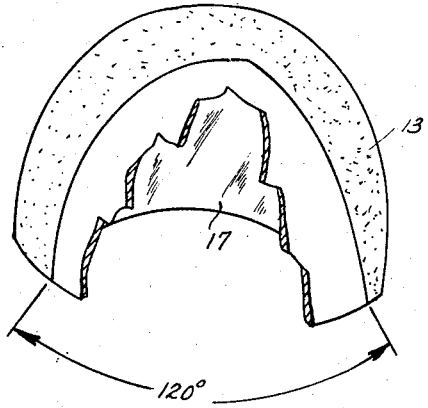
Figure 11 is a side elevational view partially in section, showing a cover portion of the apparatus for use in the embodiments of this invention.

In Figures 3, 4, and 9 another embodiment of the invention is presented, wherein planar reflecting surfaces are not used. Instead, a cover 13 is provided, which cover allows for emission of light from the surface thereof only through a portion which provides for the proper light spread. As best seen in Figure 4, there is a transmitting area 15 extending through an angle 16 in the horizontal plane of more than 90°. As shown in Figure 11, the cover is light transmitting but has coated thereon a reflecting surface 17. The surface 17 may be coated either on the inside or on the outside of the cover without departing from the scope and spirit of this invention. The disposition of the units 21 on the aircraft shown in Figure 3 is the same as the disposition of the units 20 shown in Figure 1.

Figure 13:
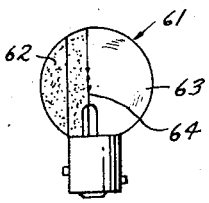
Figure 13 is a side view of a lamp of the type incorporated in the embodiments of this invention.

In Figure 9, the details of the light source of the type used in the embodiments thus far discussed are shown. A base 31 which is adapted to be secured to the aircraft by means of bolts 32 has rotatably mounted thereon a member 30. The circumference of the rotatable member 30 is provided with gear teeth 33 which cooperate with a worm gear 34 carried on the shaft 35 of motor 36. Carried on the rotatable member 30 are two lamps 40 of the type shown in Figure 13. These lamps have a sealed chamber comprising a continuous glass bulb 60, one portion of the bulb 62 having coated thereon a reflecting surface whereby portion 62 is rendered a concave mirrored surface. The opposed and overlying portion of the bulb 63 is uncoated and is convexly disposed with respect to the mirrored surface and substantially overlying the entire opposed area of the same. A light source 64 comprises a filament supported within the bulb and passing through the focal point of the mirrored surface, such disposition of the filament preventing it from interfering with the use of substantially the entire mirrored surface and the use of substantially the entire light transmiting area, whereby the reflected illumination is free of dead spots. A lamp so constructed will produce a strong beam having a spread of approximately 50°. For a more detailed description of the type or types of bulb which may be used in accordance with the provisions of this invention, reference should be had to my Patent No. 2,365,504 issued December 19, 1944.

By again referring to Figure 9, it will be seen that when the motor 36 is powered, the lamps 40 rotate, and when powered produce a beam of light varying in intensity at any given point within the beam from a minimum intensity above zero to a maximum intensity. A light having such a varying intensity has been and will be referred to hereinafter as an undulating beam.

When the unit shown in Figure 9 is covered by a cover such as that designated by 12 in Figure 8, and disposed in the aircraft wing in front of reflecting surfaces 7 and 8, an undulating beam of light having a spread equal to the angle between the reflecting surfaces is produced; and when the unit shown in Figure 9 is enclosed by a cover such as that designated by numeral 13 in Figures 4 and 11, and the lamps 40 and the motor 36 are powered, an undulating beam is produced having a spread equal to the angle 16, shown in Figure 4.

Figure 5:
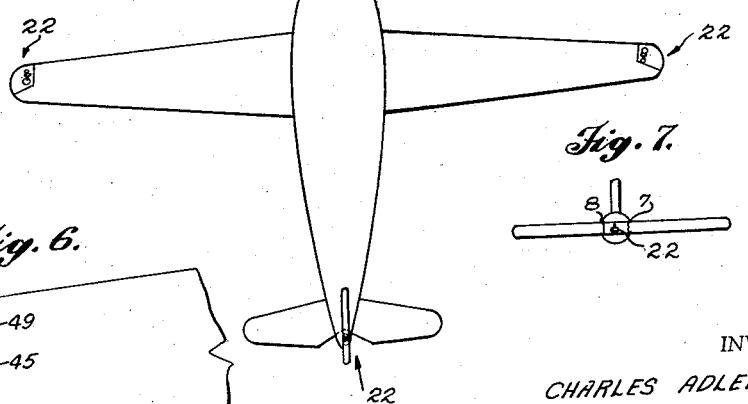
Figure 5 is a plan view of an aircraft on which still another embodiment of the apparatus of this invention has been installed.
Figure 7:
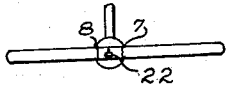
Figure 7 is an end view showing the embodiment of the apparatus presented in Figures 5 and 6, as installed on the tail portion of an aircraft.
Figure 6:
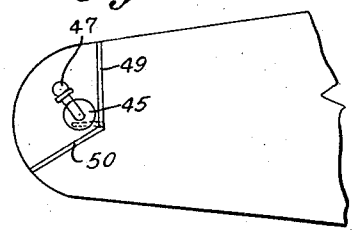
Figure 6 is a fragmental detail of the end of a wing of the aircraft shown in Figure 5.

A further embodiment of this invention is presented in Figures 5, 6, 7, and 10. The units 22 of Figure 5 are disposed in the same positions as the units 20 and 21 of Figures 1 and 3 respectively. That is, one unit is disposed at the tip of each wing and one is disposed in the tail portion of the aircraft. As best shown in Figure 6, the instant embodiment incorporates a lamp which is oscillated through at least a 90° arc in the horizontal plane. By referring to Figure 10 it will be seen that a motor 48 having a shaft 41 drives a worm 42 carried on that shaft. The worm cooperates with a gear 43 to which is attached eccentrically one end of a link 44, the other end of link 44 being attached to a rotatable member 45 which member carries a support 46, the support 46 carrying a lamp 47. The rotatable member 45 is mounted on a base 51 which is secured in position by bolts 52. The lamp 47 is of the same type as lamp 40 of Figure 9, the construction of which was presented and explained in detail with regard to Figure 13. The eccentric attachment of the link 44 to the gear 43 and rotatable member 45 causes that member to oscillate when the gear 43 is driven through worm 42 by motor 48. As is well-known to those skilled in the art, the eccentric attachments may be made at such distances from the center of gear 43 and rotatable member 45 as is desired for a predetermined amount of oscillation.

Preferably, the rotatable member 45 and therefore the lamp 47 are caused to oscillate through an arc of between 110° and 150°. According to the preferred construction, the rotatable member 45 of the type shown in Figure 10, mounted on the wings would be set for oscillation at 110° and the member mounted on the tail would be set for oscillation through 140°, or all units would be set for 120° oscillation, thus giving the desired 360° coverage. The lamps in the wing units preferably oscillate through the full angle, while that in the tail preferably is set to oscillate through half of the full angle on either side of a central position.

Figure 10:
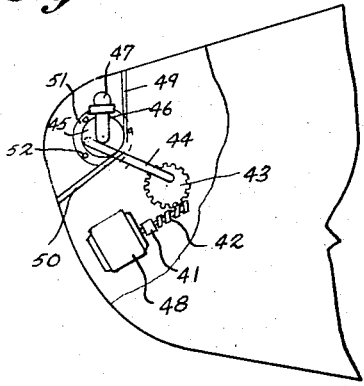
Figure 10 is a plan view of the end portion of an aircraft wing showing the details of construction of parts of the embodiment of the invention shown in Figure 5.

In the embodiment shown in Figure 10, planar reflecting surfaces 49 and 50 are provided, said surfaces functioning to reflect light in accordance with this invention, the same as planar surfaces 7 and 8 shown in Figure 8. However, a cover, such as that designated by the numeral 13 in Figure 11 may be incorporated in place of the reflecting surfaces 49 and 50 in an alternate construction of the instant embodiment.

As will be appreciated from the above discussion, the various embodiments of this invention provide means for producing a beam of undulating light which has a spread through an angular arc similar to the light spread produced by the conventional low power aircraft positioning lights. The apparatus, however, conveniently provides a high intensity beam and therefore the need for standard anti-collision lights carried on the fuselage, is eliminated.

Certain safety provisions are provided by this invention. As shown in Figure 9, two lamps are provided in the embodiments presented in Figures 1 and 3. By providing two lamps in each apparatus, and connecting those lamps in parallel a "fail-safe" unit is provided, as the failure of one lamp to produce light does not render the apparatus ineffective because, although the beam is weaker, a beam having the desired spread is produced. Moreover, the apparatus is such that should the driving motor 36 fail, a beam is still produced, although such beam is not undulating. The "fail-safe" feature may be included within the embodiment shown in Figure 10 merely by having support 46 carry two lamps. Of course, the electrical connection from the lamps to the power supply may be of any of the well-known and conventional types used when rotating or oscillating is imparted to a lamp or like device.

In the embodiments of Figures 1 and 3 wherein by the preferred construction, lamps 40 are provided, those lamps should be spaced with non-reflecting portions of the mirrored surfaces being in opposed relation. Such disposition yields the most satisfactory undulating beam.

Figure 12:
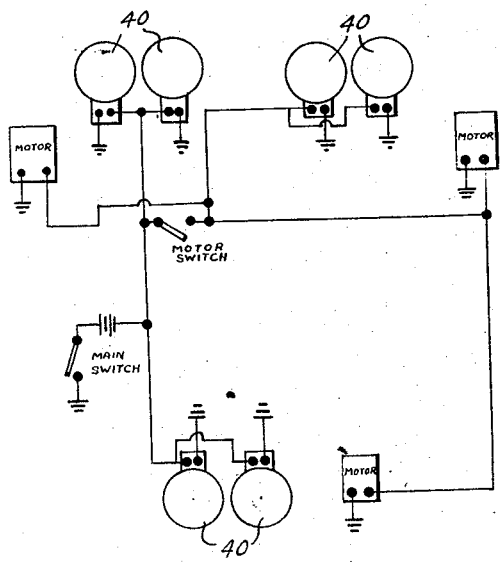
Figure 12 is a schematic wiring diagram showing the electrical connections of an overall system incorporating an embodiment of this invention.

In Figure 12, the electrical connections preferred are shown. It will be seen that the lamps 40 are connected in parallel to provide the safety feature above described. Of course, when the embodiment of Figure 10 is used, and two lamps are provided in each apparatus, the same connections can be made to provide the desired safety feature.

It should be understood that in the embodiment shown in Figure 8, the cover 12 need not be used, as a single cover could enclose the indented portion of the wing thereby enclosing the reflecting surfaces 7 and 8, and the light source 6. Regardless of the cover, or of desired combination of covers used, the beam should pass through one cover which renders the beam the proper color, that is, the final emergent beam from the left wing should be red; that from the right wing green, and that from the tail portion white, as is the case in conventional positioning light systems.

If it is desired to incorporate in the system means for dimming or brightening the lamps provided in the apparatus, standard dimming switches and associated circuitry may be incorporated in the circuit in a conventional manner. Moreover, if it is desired to synchronize the movements of all or any number of the lamps disposed at different locations on the aircraft, then synchronizing means may easily be adapted to cooperate with the apparatus provided by this invention.

From the foregoing description of the exemplary embodiments of this invention, it will be apparent that various modifications may be made, by one of ordinary skill in the art without departing from the scope of this invention, and it is therefore intended that when consideration is given to the appended claim, the claim be interpreted as illustrative, and not in a limiting sense.

I claim:

Apparatus for producing a beam of light continuously varying in intensity at any given point within the beam from a minimum intensity above zero to a maximum intensity, comprising, in combination, an aircraft wing member, a light source positioned at the tip of said wing member, said source comprising a plurality of lamps, each having a continuous glass bulb, wherein a portion of said bulb is a convex surface having coated thereon a reflecting material which renders said surface a mirror and wherein another portion of said bulb is a light transmitting area, the outer surface of which is convexly disposed with respect to said mirror and substantially overlying the entire exposed area of said mirror, a filament supported within said bulb at the focal point of said mirror so as to not substantially interfere with the use of the entire mirror or the entire light transmitting area, whereby the reflected illumination is free of dead spots; a base having disposed thereon a rotatable member in which said plurality of lamps are mounted with the non-reflected surfaces of said mirrors being in opposed spaced relation; means for imparting angular movement to said member so as to thereby impart angular movement to said plurality of lamps; a cover enclosing said lamps, said cover having a light transmitting surface allowing for a light spread in at least one direction through said cover of more than 90°; and two planar reflecting surfaces on said wing member behind and adjacent said light source, said reflecting surfaces having an included angle between them of at least 90° but less than 180° whereby the light emerging from said plurality of lamps is shaped into a beam with a light spread in at least said one direction through more than 90° but less than 180°.

References Cited in the file of this patent

UNITED STATES PATENTS

| | | |
|---|---|---|
| 1,397,822 | Peters | Nov. 22, 1921 |
| 2,122,008 | Marsters et al. | June 28, 1938 |
| 2,328,032 | Roper | Aug. 31, 1943 |
| 2,365,504 | Adler | Dec. 19, 1944 |
| 2,605,384 | Adler | June 29, 1952 |
| 2,719,281 | Roth et al. | Sept. 27, 1955 |
| 2,810,065 | Peck | Oct. 15, 1957 |